3,157,575
COMPOSITIONS AND PROCESS RELATING TO MACROCYTIC ANEMIAS
Adrian Leonard Luhby, 2794 Webb Ave., New York 68, N.Y.
No Drawing. Filed June 16, 1959, Ser. No. 820,596
12 Claims. (Cl. 167—65)

The invention relates to a method and to a composition for the alleviation and prevention of a metabolic condition incident to the development of an anemia.

More particularly it pertains to the alleviation of macrocytic anemias and includes correlated improvements and discoveries whereby those conditions are wholly or to a marked extent alleviated.

An object of the invention is to provide an effective method for the treatment of metabolic conditions which may lead to the development of anemias and particularly megaloblastic and macrocytic anemias.

A further object of the invention is the provision of a method which readily corrects certain types of macrocytic anemias.

A particular object of the invention is the provision of a method for the alleviation and prevention of megaloblastic and macrocytic anemias which entails the administration of histidine in a composition suitable for such administration.

A further object is to provide histidine-containing compositions suitable for prevention and alleviation of megaloblastic macrocytic anemias.

A still further object of the invention is the provision of a method for effective diagnosis and determination of folic acid deficiency.

Another object of the invention is the provision of a method for differentiation of megaloblastic anemias due to folic acid deficiency from those anemias due to vitamin $B_{12}$ deficiency.

Additional objects of the invention are the provision of a method for effective diagnosis and determination of liver disease characterized by impairment of folic acid and histidine metabolism, and for effective diagnosis and determination of toxemia of pregnancy where the folic acid and histidine metabolism are impaired.

Other objects of the invention will in part be obvious and will in part appear hereinafter.

The invention accordingly comprises the several steps and the relation of one or more of such steps with respect to each of the others and the product possessing the features, properties, and the relation of constituents, which are exemplified in the following detailed procedure, and the scope of the invention will be indicated in the claims.

Practice of the invention provides a method and a composition for the treatment, i.e., alleviation of metabolic conditions incident to the development of anemias especially macrocytic anemias which entails the administration of the amino acid histidine to individuals having metabolic conditions which may lead to an anemia and especially to those individuals afflicted with certain types of macrocytic anemias. I have found that such administration gives an unexpected and unique result, namely, the anemia is promptly and materially improved. Further, I have found that the administration of histidine is effective in certain conditions, notably pregnancy, and in certain diseases particularly liver disease which are known to lead to macrocytic anemia, for it delays or prevents the onset of anemia, especially megaloblastic macrocytic anemia in these conditions and diseases.

Practice of the therapeutic aspect of this invention is also effective for the alleviation of conditions arising from a body deficiency or loss of histidine, such situations occurring in, among other, pregnancy. Megaloblastic macrocytic anemia has been known to be due to, among other things, a specific deficiency or lack of availability to the body cells, of either folic acid, vitamin $B_{12}$ or a combination of both. The histidine administration is particularly effective in correcting the megaloblastic macrocytic anemia in those instances where there is an actual or a metabolic deficiency of folic acid. The unexpected and surprising aspect of this action is that the anemia is corrected even though the folic acid deficiency is not corrected.

The administration of histidine has a beneficial therapeutic effect in the following types of anemias, among others:

(1) Nutritional macrocytic anemia.
(2) Macrocytic anemia associated with sprue.
(3) Megaloblastic anemia associated with gastro-intestinal malabsorption syndromes or after intestinal "shunting" operations.
(4) Megaloblastic or macrocytic anemia of pregnancy.
(5) Megaloblastic anemia of infancy and early childhood.
(6) Macrocytic anemia associated with liver insufficiency and cirrhosis.
(7) Macrocytic anemia associated with toxemia of pregnancy.
(8) Certain instances of pernicious anemia, namely, those complicated by a simultaneous folic acid deficiency.
(9) Anemia due to histidine deficiency.

The method has been utilized viz., the administration of histidine, in several score of individuals with certain other types of anemias and diseases and I have found no similar effect. This includes anemia due to acute leukemia, anemia associated with certain types of cancer, Hodgkin's disease, aplastic anemia, Cooley's anemia, sickle cell anemia, anemia of prematurity and those nutritional anemias not complicated by folic acid or histidine deficiency.

In the therapeutic use of histidine, the surprising and unexpected finding was that patients treated with histidine promptly began to feel better and their anemia quickly improved, even though the folic acid deficiency was not corrected as indicated by a striking increase in the urinary excretion of formiminoglutamic acid within about 48 to 72 hours from the onset of histidine therapy. Subsequently I found that those patients who would excrete large amounts of formiminoglutamic acid upon administration of adequate and appropriate amounts of histidine as set forth below are precisely the opens who responded best clinically and hemotologically to histidine dosages. Presumably, histidine is producing its effect in these individuals by a different (still unknown) metabolic pathway. It appears that those individuals whose body tissue folic acid content is low, sub-normal or borderline, require more than the amounts of histidine available to them from dietary sources, in order to maintain clinical, hematologic and physiologic normality. Therein resides the utility, uniqueness, unexpectedness, importance and value of the histidine method.

I have also found in recent studies that individuals with folic acid deficiency excrete abnormally large amounts of histidine in their urine. This uniary loss of histidine leads to histidine depletion in the body. In normal pregnancy it was found that greater than normal amounts of histidine were excreted in the urine commencing from about the sixth week of pregnancy. In pregnant women with megaloblastic macrocytic anemia, which usually occurs in the last trimester of pregnancy and which was not responsive to vitamin $B_{12}$ administration but responsive to small doses of folic acid, hence indicating folic acid deficiency, even larger amounts of histidine were found in the urine than in non-anemic pregnant women in the same period of gestation.

After folic acid administration to these patients with megaloblastic macrocytic anemia who have abnormally increased urinary histidine excretion, the urinary histidine output decreases strikingly. Thus, this evidence indicates that in folic acid deficiency there is body depletion of histidine due to increased urinary loss of this amino acid in particular. The beneficial therapeutic effect of the administration of histidine in the amounts set forth herein in folic acid deficiency anemias is greater than can be achieved with the amounts of histidine available even in high protein diets which provide about 2 grams of histidine per day. High protein diet therapy is inadequate to achieve the beneficial effects contemplated by this invention wherein a dosage of at least 5 grams per day is employed. In such folic acid deficiency anemias treated with folic acid more rapid and beneficial therapeutic effects are obtained when at least the critical minimum of histidine is administered in combination with the administration of the folic acid.

I have also found, most unaccountably, that the therapeutic activity of histidine for these purposes is strikingly enhanced beyond any possible additive contribution by the addition to histidine of para-aminobenzoic acid. I have also discovered that similar strikingly enhanced effects are achieved by the addition to histidine of folic acid. The compositions are predominantly histidine with a minor proportion of the para-aminobenzoic acid or folic acid. The para-aminobenzoic acid may be present in an amount from about 1% to about 45% by weight of the histidine calculated as the free base. The folic acid may be present in an amount from about 0.0006% to about 0.25% by weight of histidine calculated as the free base. The proportion by weight of histidine to folic acid will be from about 165,000 to 1 to about 400 to 1. I have also found that the addition of serine (including the D, L, and DL forms and mixtures and salts thereof) to histidine similarly and unaccountably gives greater effect than with either histidine or serine alone. The serine may be present in an amount from about 6% to about 100% by weight of histidine calculated as the free base. The combination of histidine with para-aminobenzoic acid, histidine with folic acid, or histidine with serine results in truly synergistic combinations wherein the observed clinical results is far greater than may possibly be accounted for by similar dosages of either of the components of these combinations.

Furthermore the histidine may be mixed with the folic acid, para-aminobenzoic acid and serine and the combination administered with beneficial effects.

In addition to para-aminobenzoic acid itself, its non-toxic salts may be employed as for example alkali metal para-aminobenzoate, such as sodium or potassium salts, alkaline-earth metal para-aminobenzoate, as for example the calcium salt. Similarly non-toxic salts of serine, as for example the acidic salts such as the hydrochlorides, or the basic salts such as the sodium salts may be effectively employed.

The therapeutic method is carried out as follows: Histidine preferably L-histidine, although D-histidine, DL-histidine, racemic and various combinations thereof and salts thereof are administered by mouth as a powder, tablet or in solution. The powder may be dissolved in an appropriate menstruum preferably an aqueous medium, the histidine being readily soluble in most aqueous fluids. The therapeutic dosage may be from about 5 to about 15 grams of histidine calculated as the free base daily, given in divided doses of about 1.5 to about 3.8 grams as seems appropriate, desirably before meals. Occasionally a large dose, e.g., about 33 grams daily may be required. Usually about 3.8 grams may be administered 3 times a day before meals for a total daily dose of about 11.5 grams. The dosage is continued until the desired hematological improvement is attained.

Salts of the histidines or combinations of them are equally effective as an equivalent amount of the free base. Various salts involving any non-toxic anion or cation may be used. Examples are, the mono- or di-hydrochloride sulphates and phosphates, etc. and such non-toxic alkaline metal salts as the potassium and sodium salts.

The composition for the alleviation and prevention of certain metabolic conditions incident to the development of macrocytic anemias and for the alleviation and prevention of macrocytic anemias contains as the essential active ingredient histidine including its salts. For enhanced effect, folic acid, para-aminobenzoic acid, or serine may be added. Administration may be accomplished in conjunction with an innocuous and non-toxic substance that is chemically inert with the histidine and the composition being in dosage unit form. Further, the innocuous and non-toxic substance may be a liquid or a solid, or more particularly, a pharmaceutical carrier and for this purpose utilization may be made of lactose, a soluble starch and the like. Furthermore, the carrier may be a liquid preferably an aqueous medium, and when the administration is subcutaneously, intramuscularly, or intravenously, the histidine would be dissolved in sterile water or physiological saline.

In certain instances the administration of histidine or mixtures therewith of either folic acid, paraaminobenzoic acid or serine as a dietary supplement may be desirable where prophylaxis is desired in subjects where anemic tendencies are suspected or anticipated.

In assessing the hematologic effectiveness of anti-anemia materials after administration of test substances to anemic patients, the subsequent rise of the peripheral red blood cell count and the hemoglobin concentration are followed, and the patterns of the rise and fall of the reticulocyte percentage count are followed. The red cell count and hemoglobin concentration usually begin to rise within 4 to 5 days and continue upward at a rate depending upon the effectiveness of the test substance and the extent of the anemia present. The reticulocyte count characteristically in response to previously known anti-anemic materials for megaloblastic anemia, begins to rise on the 4th to 5th day, reaches its peak on the 7th to 10th day, and then sharply decreases again, returning to almost baseline levels by the 14th to 21st day. With highly potent anti-anemic materials this response may be shifted toward a day earlier, with low potency substances, a day or so later. In these anemias, there often are low white blood cell and platelet counts, which rise to normal values following effective therapy. Moreover, clinical improvement of the patient follows.

Moreover, I have found that the administration of a daily dosage of histidine in a dosage equal to a critical amount daily for a period of about 48 to about 72 hours furnishes, in combination with a test for form-iminoglutamic acid in the urine of the person to whom such dosage is administered, a method for effective diagnosis of folic acid deficiency, whether the folic acid deficiency is caused by an actual deficiency or by the inability of a human body to utilize folic acid in its metabolic processes as it involves in particular histidine metabolism. The new method now provides a test for folic acid deficiency that is specific, sensitive and reliable.

The invention provides a specific and effective test to determine in a person with macrocytic megaloblastic anemia the existence of folic acid deficiency and to differentiate such anemia from that due to vitamin $B_{12}$ deficiency. Such diagnostic procedure is most useful in the differentiation of anemias for the reason that the clinical manifestations of anemias responsive to treatment with folic acid are for the most part otherwise indistinguishable from those anemias which are responsive to treatment with vitamin $B_{12}$. There is thus provided an effective diagnostic tool, the results of which are reliably indicative to the physician of the mode of treatment to be employed. Thus, the absence of a significantly elevated urinary formiminoglutamic acid level following administration of histidine or its non-toxic salts signifies the absence of folic acid deficiency and differentiates the megaloblastic anemia as due to vitamin $B_{12}$ deficiency, while the presence of a significantly elevated formiminoglutamic acid level identifies a folic acid deficiency, although in the latter instance the possibility of an accompanying vitamin $B_{12}$ deficiency is not ruled out.

Furthermore, the administration of the critical amount of histidine daily provides a specific and effective test to determine existence of liver disease in which folic acid and histidine metabolism are adversely affected. The test identifies patients with liver disease when megaloblastic anemia and toxemia of pregnancy are not present. If a patient has macrocytic megaloblastic anemia and the physician's examination and laboratory tests indicate absense of liver disease or toxemia of pregnancy, the results of the test indicate that there is a nutritional deficiency of folic acid, providing the patient has not received any folic acid metabolic antagonist.

Moreover, in pregnant individuals that test provides a method for diagnosis of toxemia of pregnancy, and a positive test for that condition when other tests are equivocal. Patients with toxemia of pregnancy may have high blood pressure and this differentiates pregnant individuals with high blood pressure (hypertension) due to other causes from those due to toxemia.

In folic acid deficiency an imino acid metabolic intermediate, formiminoglutamic acid, accumulates, which apparently arises from degradation of histidine. Formiminoglutamic acid is normally further degraded to glutamic acid in the presence of the physiologically active form of folic acid, viz. tetrahydrofolic acid. In the absence of tetrahydrofolic acid (either because of a dietary deficiency of the folic acid or failure of gastrointestinal absorption, or failure of conversion to tetrahydrofolic acid, due to the lack of necessary liver enzymes, or the pressure of a folic acid antagonist, or inasmuch as increased metabolic requirements reduce the stores) formiminoglutamic acid accumulates in the human body and is excreted in the urine. Excretion of this compound is an indicator of metabolic or physiologic folic acid deficiency. However, many individuals with anemia and with what should be a complicating clinical or subclinical folic acid deficiency were found who did not excrete formiminoglutamic acid. The test for formiminoglutamic acid in the urine thus appeared to be unsatisfactory for diagnosis. However, I have found that if the subject of diagnosis is given histidine over a period of at least about 48 hours in the critical amount of about 5 to about 15 grams per day of histidine calculated as the free base the assay of formiminoglutamic acid in the urine becomes an effective and reliable test for distinguishing folic acid responsive anemias from other anemias not so responsive.

Dosages at the lower level of the critical range are employed with infants and children.

Furthermore, after the administration of histidine for a period of at least about 48 hours, the formiminoglutamic acid assay becomes an effective and reliable test for diagnosis and determination of liver disease characterized by impairment of folic acid and histidine metabolism, and for diagnosis and determination of toxemia of pregnancy where the folic acid and histidine metabolism are affected.

The diagnostic method is carried out as follows: a metabolic load of L-histidine in a dosage of about 5 grams daily to about 15 grams daily calculated as the free base is administered to a human host for at least 48 hours and preferably for about 47 to about 72 hours. The histidine employed may be administered in the forms described above for therapeutic administration. During the last 24 hour period and preferably at the end of the period a sample of urine is collected under concentrated acid to maintain the pH of the urine below 2.0. Quantitative measurement is made of the urinary formiminoglutamic acid concentration. Effective quantitative measurement is made by a technique that is based upon enzymatic reactions involved in the metabolism of folic acid and formiminoglutamic acid. The assay method employed involves converting formiminoglutamic acid in the urine to 5,10-methenyl tetrahydrofolic acid by enzymatic and chemical conversion and the concentration of the latter is determined by spectrophotometric measurement of its optical density at its wave lengths of maximum absorption such being either 350 m$\mu$, 365 m$\mu$, or 380 m$\mu$.

The quantitative measurement may be particularly advantageously carried out as follows:

The enzyme reagent used is prepared as follows:

Dried defatted liver powder is obtained by homogenizing 100 grams of fresh pork liver with 500 ml. of acetone in a Waring Blendor for one minute. The mixture is filtered through a Büchner funnel and the liver cakes rehomogenized with 500 ml. acetone for one minute and filtered. The cake is broken up and allowed to dry in air. 100 grams of the dried liver powder are stirred with 1000 ml. water for 15 minutes at room temperature. The suspension is centrifuged at 20,000×gravity for 15 minutes and the precipitate discarded. To 1,000 ml. of supernatant solution add 214 grams ammonium sulfate and keep at 1–3° C. for one hour. The precipitate formed is collected by centrifuging at 20,000×gravity for 15 minutes at 1–3° C. The precipitate is suspended in 30 ml. of water and stored in the refrigerator overnight. The latter suspension is then centrifuged for two hours at 30,000×gravity at 1–3° C. for two hours, and the supernatant discarded. The precipitate is dissolved in 30 ml. of 0.2 M sodium acetate. After two hours, it is centrifuged and the precipitate is discarded. The remaining solution contains both formiminoglutamic acid transferase and cyclodeaminase. It is kept frozen at —20° C. until used.

The tetrahydrofolic acid reagent used is prepared by the following new method which is simpler and safer than the methods heretofore employed.

100 mg. platinum oxide (Adams catalyst) is suspended in 25 ml. glacial acetic acid. Hydrogen gas is bubbled into the solution at atmospheric pressure until platinum black precipitates. 200 mg. 1-folic acid suspended in 25 ml. glacial acetic acid is then added to the above solution. Hydrogen is again bubbled into this reaction mixture at atmospheric pressure until reaction is completed (4–6 hours). Completion of reaction can be recognized when solution no longer absorbs hydrogen gas as determined by a water manometer. When reaction is completed, the excess hydrogen is washed out by bubbling helium gas through the reaction mixture, followed by nitrogen gas to keep oxygen out of the atmosphere in the reaction vessel above the solution. Entire reaction mixture is then poured into stoppered centrifuge tubes, nitrogen again bubbled through, tubes sealed tightly and centrifuged at 1000–2000 r.p.m. for 10 to 20 minutes. The clear supernatant containing the dl-tetrahydrofolic acid is decanted into screw top test tubes and sealed.

By employing the above steps the yield of tetrahydrofolic acid is significantly greater than by methods not employing nitrogen gas and by separation of the supernatant containing the tetrahydrofolic acid from the precipitate by filtration in the open atmosphere. This can be stored at —20° C. for 6 to 12 months. To use, 25 ml. are removed into a suction flask and connected to vacuum at room temperature until glacial acetic acid is evaporated. To each residue equivalent to 25 ml. of original solution, 51.1 ml. of 1.1 molar mercaptoethanol are added. Concentrated 16 N KOH is added dropwise to the latter solution, stirring until all the tetrahydrofolic acid goes into solution and pH reaches 7.0–7.5. Yields of 70% to 80% of theoretical maximum are usually obtained. These solutions contain at least 7–8 micromoles of dl-tetrahydrofolic acid per milliliter. This solution of tetrahydrofolic acid is stable for ordinary use, however, it is preferable to store it at −20° C.

A 1 molar potassium phosphate buffer of pH 7.2 is prepared in standard fashion.

The acidity of the urine samples to be tested is adjusted to between pH 6 and 7 with a minimum of NaOH.

To 0.1 ml. of a test urine sample, pH adjusted to between 6 and 7, placed in a 3.0 ml. test tube, is added 0.25 ml. of the enzyme reagent, 0.1 ml. of the tetrahydrofolic acid reagent and 0.1 ml. 1 M potassium phosphate buffer of pH 7.2. Water is then added to bring the total volume of 1.0 ml. If the concentration of formiminoglutamic acid in urine is expected to be low, additional amounts of pH 6 to 7 urine can be added as seems appropriate, instead of water, to bring the final volume to 1.0 ml. If the urine concentration of formiminoglutamic acid is expected to be high, the urine is diluted appropriately 1:10, 1:100, 1:500 or as necessary, before use.

The mixture is allowed to react at 25° C. for 30 minutes. 0.3 ml. 10% perchloric acid was then added and the mixture allowed to react at room temperature for 2 hours and then centrifuged at about 1500 r.p.m. for 10 minutes.

The supernatant is removed into a 1.5 ml. silica cuvette with an 0.5 or 1.0 cm. light path and its optical density is read at 350 millimicrons (m$\mu$). A "urine" control for the non-specific absorption of the mixture of urine, tetrahydrofolic acid and phosphate buffer reagents is prepared in an identical fashion as set forth above for the test urine, but substituting 0.25 ml. water for the 0.25 ml. of enzyme reagent, and the optical density at 350 m$\mu$ of this sample is also obtained. An "enzyme" control for the non-specific absorption of the enzyme preparation in combination with the tetrahydrofolic acid and phosphate buffer is also prepared in an identical manner as set forth for the test urine, but a 0.1 ml. of water was substituted for the 0.1 ml. of urine. The optical density of this sample at 350 m$\mu$ is also obtained. The optical density readings of the urine and enzyme control samples are added and then subtracted from the optical density reading of the test urine sample. The latter result, the "corrected optical density," is then multiplied by a factor relating optical density units to micrograms of formiminoglutamic acid per ml. of solution. The latter factor is obtained by substituting 0.1 ml. of a solution containing 17.4 micrograms of pure (synthetic) formiminoglutamic acid for the 0.1 ml. of test urine, and determining the optical density at 350 m$\mu$ of the resulting reaction mixture obtained in a similar manner.

The optical density can also be read at 365 m$\mu$ or 380 m$\mu$ where slightly lesser extinction maxima of 5,10 methenyl tetrahydrofolic acid also exist.

The measurement results in assay of the formiminoglutamic acid in the urine sample in terms of micrograms ($\gamma$) per milliliter (ml.). The measurement may alternatively be made on a sample of urine representing the final 24 hour urine excretion and values may be expressed as milligrams of urinary formiminoglutamic acid excretion during the final 24 hour period.

It has been found that in non-folic acid deficient individuals subjected to the above-described histidine metabolic loading, the urinary formiminoglutamic acid concentration does not exceed about 30 to about 35 $\gamma$/ml. In sharp contrast to this, individuals with megaloblastic anemia due to folic acid deficiency, under identical conditions, exhibit urinary formiminoglutamic acid concentrations of from 3 to 1000 times greater than do individuals not having folic acid deficiency. Under the described diagnostic procedure, no patient with uncomplicated Addisonian pernicious anemia in relapse, recognized as being due to a deficiency of vitamin $B_{12}$, showed formiminoglutamic acid excretion in excess of about 35 $\gamma$/ml. All patients with other types of megaloblastic anemia showed an excretion value sufficiently above normal to be unequivocal. The concentrations varied from about 90–2000 $\gamma$/ml. Certain individuals in whom folic acid deficiency could at best be classified as "borderline" or "sub-clinical" were distinctly diagnosable. Normal individuals as well as those with megaloblastic anemia due to Addisonian pernicious anemia could not be induced to excrete urinary forminimoglutamic acid above 35 $\gamma$/ml. until histidine loading doses of about 27 to about 33 grams calculated as the free base per day were administered.

The results with patients having liver disease and toxemia of pregnancy are comparable to the results obtained in folic acid deficient individuals. It has been found that patients who did not have liver disease and who did not have toxemia of pregnancy when subjected to the above described histidine loading had urinary formiminoglutamic acid excretions that did not exceed about 30 to about 35 $\gamma$/ml. In sharp contrast, under identical conditions patients with liver disease and those with toxemia of pregnancy exhibited urinary forminimoglutamic acid concentrations of from 3–100 times as much.

As illustrative embodiments of the invention the following examples are presented to illustrate the therapeutic effectiveness of histidine in various megaloblastic macrocytic anemias:

EXAMPLE 1

L-histidine, as the mono-hydrochloride salt dissolved in an appropriate aqueous fluid, e.g., tomato juice, was orally administered to a patient diagnosed as having sprue with megaloblastic macrocytic anemia. Five grams were given three times daily before meals for one day for a total dose of 15 grams. On the second day after taking the histidine the reticulocyte percentage in the blood had risen to 6.0 and by the fifth day reached a peak of 10.2. This is an unusually prompt response and is quicker than observed with other previously known anti-megaloblastic anemia medications such as folic acid, vitamin $B_{12}$ or liver extract. The red blood cell count rose from 2.03 to 2.85 per cu. mm. and the hemoglobin concentration from 8.0 to 11.0 grams percent in the same five day period, also an unusually prompt and materially striking effect. These results indicate that the histidine treatment is acting more directly or supplying the necessary missing ingredient for hemoglobin and red cell formation more efficiently in such patients than the previously used standard treatments such as folic acid, vitamin $B_{12}$, liver extract, or high protein diet. Bone marrow examination done on the sixth day after start of therapy showed distinctive improvement of the megaloblastic features, thus further demonstrating the curative nature of the histidine therapy. In addition, the patient improved clinically as evidenced by being stronger, more alert, better appetite, and decrease in size and quantity of the stools. The day after administration of the histidine, the patient volunteered that he felt subjectively improved.

*Summary of Blood Findings in Example 1*

| Blood count of patient showed— | Before Histidine Treatment | After Histidine Treatment For One Day |
|---|---|---|
| Red blood cells (millions per cu. mm.) | 2.03 | 2.85 |
| Hemoglobin concentration (grams percent) | 8.0 | 11.0 |
| Reticulocytes (maximum percent) | 1.4 | 10.2 |
| Hematocrit (percent) | 29.5 | 35. |
| White blood cell count (per cu. mm.) | 5,800 | 7,550 |

EXAMPLE 2

L-histidine monohydrochloride was orally administered to a patient diagnosed as having nutritional macrocytic anemia in three divided does of 5 grams each day in a flavored aqueous menstruum, for a total does of 15 grams for only day only. By the 7th post treatment day, the reticulocytes rose to 4.0 percent, the white cells to 5,350 per cu. mm., the red count to 2.4 million/mm.$^3$ and the hemoglobin to 10.6 grams percent. The patient felt stronger and more alert. Repeated bone marrow examination on 5$^{th}$ post treatment day showed improvement. This illustrates an excellent response to a low total dose of the medication in a patient who is not very anemic.

Two weeks later, the patient partially relapsed. The red count fell to 2.17 million/mm.$^3$, the hemoglobin to 9.0 grams percent, the white cell count to 4,000 and reticulocytes 0.2 percent. At this time, the patient was given 30 milligrams of folic acid orally daily for an eleven day period. By the 9$^{th}$ day following this treatment, the reticulocytes had risen to a peak of 10.0 percent, the red count to 2.76 million per mm.$^3$ and the hemoglobin to 11.0 grams percent. On the 14$^{th}$ day after folic acid, the red cell count was only 2.72, the hemoglobin 10.8 grams percent. This illustrates that in the not very anemic patient, even large doses of previously used treatment such as folic acid, does not produce a very dramatic response. By comparison, the previous course with histidine produced an excellent response.

*Summary of Blood Findings in Example 2*

| Blood count of patient showed— | Before Histidine Treatment | After Histidine Treatment For One Day |
|---|---|---|
| Red blood cells (millions/mm.$^3$) | 2.11 | 2.40 |
| Hemoglobin (grams percent) | 9.8 | 10.6 |
| Recticulocytes (maximum percent) | 0.2 | 4.0 |

EXAMPLE 3

L-histidine monohydrochloride was orally administered to a patient diagnosed as having megaloblastic macrocytic anemia of pregnancy in a flavored aqueous menstruum, 5 grams 4 times daily for a total daily dose of 20 grams, for a seven day period. The hemoglobin and red cell count began to rise on the 2nd post treatment day. The hemoglobin reached a level of 12 grams percent and the red cell count 3.8 millions/mm.$^3$ on the 6th post treatment day. This is again a quicker and more dramatic increase of these blood values and a prompter alleviation of the anemia than by previously known medications such as folic acid. Concomitantly with the improvement of the blood, the patient volunteered she felt stronger. The patient excreted considerable quantities of formiminoglutamic acid in her urine begining on the third post medication day. This finding plus her previously insignificant blood response to vitamin B$_{12}$ and liver extract therapy is consistent with the presence of a folic acid deficiency in the patient.

*Summary of Blood Findings in Example 3*

| Blood count of patient showed— | Before Histidine Treatment | After Histidine Treatment For 7 Days |
|---|---|---|
| Red blood cells (millions/mm.$^3$) | 2.4 | 3.8 |
| Hemoglobin (grams percent) | 9.5 | 12.0 |
| Reticulocytes (maximum percent) | 0.3 | 4.0 |

EXAMPLE 4

L-histidine monohydrochloride was orally administered to a patient diagnosed as having nutritional megaloblastic macrocytic anemia in 4 gram doses dissolved in a flavored aqueous menstruum, 4 times a day for a total daily dose of 16 grams. The treatment was continued for 9 days. The hemoglobin and red cell count began to rise promptly following the start of therapy and continued to rise to the end of the treatment period. These results illustrate prompt, beneficial effectiveness.

*Summary of Blood Findings in Example 4*

| Blood count of patient showed— | Before Histidine Treatment | After Histidine Treatment For 9 Days |
|---|---|---|
| Red blood cells (millions/mm.$^3$) | 2.45 | 3.5 |
| Hemoglobin (grams percent) | 7.5 | 11.4 |
| Reticulocytes (maximum percent) | 1.0 | 4.2 |

EXAMPLE 5

L-histidine monohydrochloride was orally administered to a patient diagnosed as having megaloblastic macrocytic anemia with liver insufficiency, 5 grams in an aqueous menstruum, 3 times daily for a total daily dose of 15 grams. Treatment was continued for 30 days. The hemoglobin and red cell count began to rise promptly. The reticulocytes rose promptly and followed a slightly extended pattern for typical therapeutically effective materials, reaching 13.5% on the 5th day. This patient also excreted large amounts of formimino-glutamic acid in the urine after the histidine administration was begun. The patient improved clinically with the histidine treatment.

This illustrates that histidine administration can produce a complete remission and alleviation of certain megloblastic anemias, particularly in those instances in which the histidine administration is followed in 48 to 72 hours by increased urinary excretion of formiminoglutamic acid.

*Summary of Blood Findings in Example 5*

| Blood count of patient showed— | Before Histidine Treatment | After Histidine Treatment For 30 Days |
|---|---|---|
| Red blood cells (millions/mm.$^3$) | 1.4 | 4.0 |
| Hemoglobin (grams percent) | 6.0 | 13.8 |
| Reticulocytes (maximum percent) | 5.0 | $^1$ 13.5 |

$^1$ (5th day peak.)

EXAMPLE 6

The potentiating effect of small doses of folic acid given simultaneously with histidine is illustrated by the following example of their use and effect in a patient with nutritional megaloblastic macrocytic anemia and gastrointestinal malabsorption syndrome.

Below are listed the increase in the blood hemoglobin, red blood cell count and the maximum reticulocyte percentage which occurred in this patient following three consecutive therapeutic periods of five days in which the following were given: First period: l-folic acid, 0.9 milligram daily was given by mouth in three equally divided doses of 0.3 milligram in a flavored liquid carrier, ½ hour before meals. Second period: L-histidine monohydrochloride was given in three doses of 5 grams each in a flavored liquid carrier, ½ hour before meals for a total daily dose of 15 grams. Third period: l-folic acid, 0.3 milligram was given in combination with 5 grams of L-histidine monohydrochloride, for 3 doses daily in a flavored liquid carrier ½ hour before meals.

| Increase after each period of— | Compositions in Treatment Period | | |
|---|---|---|---|
| | (1) Folic Acid | (2) Histidine | (3) Histidine Plus Folic Acid |
| Hemoglobin (grams percent) | 1.0 | 1.5 | 3.2 |
| Red blood cells (millions/mm.$^3$) | 0.7 | 0.6 | 1.8 |
| Reticulocytes (max. percent) | 6.2 | 5.1 | 22.3 |

EXAMPLE 7

The enhancing therapeutic effect of p-aminobenzoic acid when administered with histidine is illustrated by the following example of the use and effect of these materials in a patient diagnosed as having megaloblastic macrocytic anemia due to the malabsorption syndrome associated with sprue.

After L-histidine monohydrochloride was administered orally in a flavored aqueous carrier in 3 divided 4 gram doses for a total daily dose of 12 grams for six days the increases in the patient's hemoglobin red blood cells and maximum reticulocyte percentage are shown below in column 1. At a subsequent six day period, 1 gram of p-aminobenzoic acid was administered three times daily in a flavored aqueous carrier. In a third six day treatment period, 1 gram of para-aminobenzoic acid and 4 grams L-histidine monohydrochloride in combination which provided a total daily dose of L-histidine monohydrochloride of 12 grams and p-aminobenzoic acid of 3 grams were administered together in a flavored aqueous carrier. The increases in the hemoglobin, red blood cell count and reticulocytes of the patient's blood are shown below in columns 2 and 3 respectively for the second and third treatment period.

| Increase after each period of— | Compositions in Treatment Period | | |
|---|---|---|---|
| | (1) Histidine | (2) p-Aminobenzoic acid | (3) Histidine plus p-aminobenzoic acid |
| Hemoglobin (grams percent) | 1.1 | 0.1 | 2.2 |
| Red blood cells (millions/mm.³) | 0.63 | 0 | 1.0 |
| Reticulocytes (max. percent) | 3.8 | 0.1 | 5.4 |

The effects following administration of p-aminobenzoic acid plus histidine was greater than could be expected from either substance alone.

EXAMPLE 8

The potentiating therapeutic effect of serine when administered with histidine is illustrated by the following example of their use and effect in a patient with megaloblastic macrocytic anemia of pregnancy.

In column 1 below is shown the increase of the hemoglobin, red blood cell count and maximum reticulocyte percentage following 15 grams daily of L-histidine monohydrochloride orally administered in 3 equally divided doses in an aqueous carrier. In column 2 below are the results following 10 grams daily of DL serine orally administered in a flavored aqueous carrier in 3 equally divided doses. In column 3 the results following oral administration of the combination of 5 grams of L-histidine monohydrochloride and 3.3 grams of DL serine three times daily in an aqueous carrier for a total daily dose of 15 grams of the histidine salt and 10 grams of the DL serine.

| Increase after each period of— | Compositions in Treatment Period | | |
|---|---|---|---|
| | (1) Histidine | (2) Serine | (3) Histidine Plus Serine |
| Hemoglobin (grams percent) | 2.0 | 0.4 | 3.2 |
| Red Blood Cells (millions/mm.³) | 0.3 | 0.1 | 1.0 |
| Reticulocytes (max. percent) | 2.5 | 3.0 | 4.5 |

As illustrated by the examples above, but not limited to these specific types, histidine treatment as set forth produces prompt and distinct beneficial hematological and clinical effects in the conditions and anemias claimed herein. In these situations it produces an increase of the blood hemoglobin quicker and to a greater extent and a more rapid reticulocyte response, indicating more direct effectiveness than previously known medications such as folic acid, vitamin $B_{12}$, liver extract or high protein diet alone. It appears that its hematologic effect is greatest upon hemoglobin formation, less upon red cell production, although it will effect an increase in all the blood cellular elements, i.e., the white cells, platelets and red cells.

Histidine would thus appear to be or supply a necessary ingredient for blood regeneration in the conditions and disorders outlined herein. One can only hypothesize at this time how it produces these effects. It is particularly effective in folic acid deficiency states. It may be that there is an inverse metabolic relationship between folic acid and histidine or its products. When one is low, more of the other is needed. It may be that histidine in ordinary amounts is metabolically unavailable or the body becomes histidine deficient through urinary loss in folic acid deficiency states but is hematologically effective when the amount employed in the therapeutic aspect of the invention is administered. When present in such larger amounts it may "short circuit" the folic acid metabolic pathway in some still unknown manner. It is thus a significant improvement on folic acid and the other therapeutics. It is an important ingredient for the treatment and prevention of the conditions and disorders set forth. Herein lies not only the uniqueness of histidine administration, but also its additional utility. It may be given as a preventive dietary supplement in those physiologic or metabolic conditions which may give rise to or result in macrocytic anemias, in particular megaloblastic anemia. Histidine when given with folic acid potentiates the effect of the latter in the treatment of these conditions. When para-aminobenzoic acid and serine are administered in combination with the histidine, synergistic effects are obtained.

Illustrative embodiments of the application and performance of the diagnostic method are as follows:

EXAMPLE 9

A patient was clinically demonstrated to have nutritional megaloblastic macrocytic anemia by blood, bone marrow and other tests. A metabolic load of L-histidine monohydrochloride, 15 grams daily, was administered to the patient in three divided doses one-half hour before meals in a flavored aqueous carrier for 48 hours. Urine excreted by the patient during the final 24 hour period of administration was collected under concentrated acid and the urinary formiminoglutamic acid output during that period was measured by the enzyme reaction technique set forth above. The concentration of formiminoglutamic acid in a urine sample collected at the end of the 48 hour period was also measured. The calculated amount of formiminoglutamic acid found was 98 μg./ml. of urine in the sample taken at the end of the 48 hour period, and 191.1 mg. in the total volume of urine excreted during the 24–48 hour period. At the end of 72 hours of continued histidine loading the urinary formiminoglutamic acid values were even greater.

EXAMPLE 10

In a patient demonstrated to be afflicted with Addisonian pernicious anemia in relapse and having a megaloblastic macrocytic anemia, the histidine loading procedure and the determination of formiminoglutamic acid was carried out for 72 hours in the same manner as described in Example 9. The formiminoglutamic acid concentration in the urine sample taken at the end of 48 hours was 2.2 μg./ml. The formaminoglutamic acid output during the 24th–48th hour of the period was 0.68 mg. At the end of the final 72 hours of metabolic loading, the urine concentration of formiminoglutamic acid was 7.6 μg./ml. and the total output during the final 24 hours was 6.0 mg.

Examples 9 and 10 illustrate how increased urinary formiminoglutamic acid concentration and total 24 hour urinary output of formiminoglutamic acid after the histidine metabolic load test set forth identifies a patient with folic acid deficiency, and differentiates such a subject with megaloblastic macrocytic anemia from a subject with an identical type of anemia but which is caused by a body deficiency of vitamin $B_{12}$ incident to Addisonian pernicious anemia in relapse.

EXAMPLE 11

To a patient diagnosed as having toxemia of pregnancy 15 grams of L-histidine monohydrochloride per day were orally administered in three divided doses one-half hour before meals in an aqueous carrier for a 48 hour period, and the urine collected and measured. A sample of the patient's urine at the end of the 48 hour period indicated a formiminoglutamic acid concentration of 215.5 μg./ml.; the final 24 hour output of formiminoglutamic acid was 249 milligrams.

This illustrates that in a patient with toxemia of pregnancy and no overt evidence of megaloblastic anemia increased urinary formiminoglutamic acid excretion occurs. In other pregnant patients without megaloblastic anemia or preceding liver disease, where other evidence for toxemia was equivocal, the histidine metabolic loading test unequivocally indicated the existence of toxemia of pregnancy.

EXAMPLE 12

A 15 grams per day loading of L-histidine monohydrochloride was orally administered in three divided doses one-half hour before meals in an aqueous carrier to a patient diagnosed as having hypochromic anemia of pregnancy for a 48-hour period and the urine collected and measured. A sample of the patient's urine at the end of the 48 hour period had a formiminoglutamic acid concentration of 6.1 μg./ml. and the final 24 hour output of formiminoglutamic acid was 3.6 mg.

This example illustrates that in pregnancy associated with non-megaloblastic anemia, the histidine metabolic load test does not result in increased urinary formiminoglutamic acid excretion, indicating no deficiency of folic acid, or interference with folic acid or histidine metabolism as occurs in toxemia of pregnancy.

EXAMPLE 13

L-histidine monohydrochloride was administered to a child diagnosed as having liver disease due to biliary cirrhosis in 3 divided doses of 3 grams each in an aqueous carrier over a 48 hour period and the urine collected and measured for formiminoglutamic acid. A sample of the patient's urine obtained at the end of the 48 hour load test period had a formiminoglutamic acid concentration of 405 μg./ml. The patient's urine collected during the immediately preceding 24 hour period had a total formiminoglutamic acid output of 100 milligrams. This illustrates that the occurrence of increased formiminoglutamic acid in the urine after histidine metabolic loading in an individual without megaloblastic macrocytic anemia or toxemia of pregnancy is diagnostic of liver disease.

During the course of my development of this histidine treatment I have administered histidine monohydrochloride in as large a daily dose as 85 grams without ill effect on a patient, and have administered it in various smaller daily dosages for periods up to six months and have found no toxic, harmful or deleterious effect in the patient or any interference with other nutrients or medications.

It will thus be seen that the objects sets forth above, among those made apparent from the preceding description, are efficiently attained, and, since certain changes and certain modifications in the composition which embody the invention may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

This application is a continuation-in-part of application Serial No. 784,098, filed December 31, 1958, now abandoned.

I claim:

1. A method for the alleviation of megaloblastic macrocytic anemias which comprises administering to a human host afflicted with such an anemia a member of the group consisting of histidine and the non-toxic salts thereof in a dosage of from about 5 to about 33 grams, calculated as free base, daily.

2. A method for the alleviation of megaloblastic macrocytic anemias which comprises administering to a human host afflicted with such an anemia a member of the group consisting of histidine and the non-toxic salts thereof together with folic acid, in a daily dosage from about 5 to about 33 grams of histidine calculated as free base, the amount of folic acid being from about 0.0006% to about 0.25% by weight of the histidine calculated as free base.

3. A method for the alleviation of megaloblastic macrocytic anemias which comprises administering to a human host afflicted with such an anemia a member of the group consisting of histidine and the non-toxic salts thereof together with a member of the group consisting of paraaminobenzoic acid and the non-toxic salts thereof, in a daily dosage from about 5 to about 33 grams of histidine calculated as free base, the amount of member of the group consisting of para-aminobenzoic acid and the non-toxic salts thereof being from about 1% to about 45% by weight of the histidine calculated as free base.

4. A method for the alleviation of megaloblastic macrocytic anemias which comprises administering to a human host afflicted with such an anemia a member of the group consisting of histidine and the non-toxic salts thereof together with a member of the group consisting of serine and the non-toxic salts thereof, in a daily dosage from about 5 to about 33 grams of histidine calculated as free base, the amount of the member of the group consisting of serine and the non-toxic salts thereof being from about 6% to about 100% by weight of the histidine calculated as free base.

5. A method of enhancing the therapeutic effect of histidine and the non-toxic salts thereof administered in the treatment of megaloblastic macrocytic anemias which comprises administering concurrently therewith folic acid in an amount corresponding to between about 0.0006% and about 0.25% by weight of the administered histidine calculated as free base.

6. A method of enhancing the therapeutic effect of histidine and the non-toxic salts thereof administered in the treatment of megaloblastic macrocytic anemias which comprises administering concurrently therewith a member of the group consisting of para-aminobenzoic acid and the non-toxic salts thereof in an amount corresponding to between about 1% to about 45% by weight of the administered histidine calculated as a free base.

7. A method of enhancing the therapeutic effect of histidine and the non-toxic salts thereof administered in the treatment of megaloblastic macrocytic anemias which comprises administering concurrently therewith a member of the group consisting of serine and the non-toxic salts thereof in an amount corresponding to between about 6% and about 100% by weight of the administered histidine calculated as free base.

8. A synergistic composition of matter for the alleviation of megaloblastic macrocytic anemias comprising a member of the group consisting of histidine and the non-toxic salts thereof in combination with folic acid and a pharmaceutical carrier, the daily dosage range of said member being between about 5 and about 33 grams, calculated as free base, the amount of folic acid being between about 0.0006% and about 0.25% by weight of the histidine calculated as free base.

9. A synergistic composition of matter for the alleviation of megaloblastic macrocytic anemias comprising a first member selected from the group consisting of histidine and the non-toxic salts thereof, a second member selected from the group consisting of para-aminobenzoic acid and the non-toxic salts thereof and a pharmaceutical carrier, the dosage range of said first member being between about 5 and about 33 grams, calculated as free base, daily and the amount of said second member being between about 1% and about 45% by weight of the histidine calculated as free base.

10. A synergistic composition of matter for the alleviation of megaloblastic macrocytic anemias comprising a first member selected from the group consisting of histidine and the non-toxic salts thereof, a second member selected from the group consisting of serine and the non-toxic salts thereof and a pharmaceutical carrier, the dosage range of said first member being between about 5 and about 33 grams, calculated as free base, daily and the amount of said second member being between about 6% and about 100% by weight of the histidine calculated as free base.

11. A method for the diagnosis of folic acid deficiency which comprises administering to a human host a member of the group consisting of histidine and the non-toxic salts thereof in a daily dosage of from about 5 to about 15 grams calculated as free base for a period of from about 48 to about 72 hours, and at substantially the termination of said period determining the urinary formiminoglutamic acid excretion.

12. The method of diagnosing folic acid deficiency which comprises determining the formiminoglutamic acid content of the urine of a human host to whom a member of the group consisting of histidine and the non-toxic salts thereof is administered in a daily dosage of between about 5 and about 15 grams, calculated as free base, a formiminoglutamic acid level in excess of about 30–35 micrograms per ml. identifying folic acid deficiency, a formiminoglutamic acid level below about 30–35 micrograms per ml. at least 48 hours after initial administration of said member signifying absence of folic acid deficiency.

References Cited in the file of this patent
UNITED STATES PATENTS

| | | |
|---|---|---|
| 1,625,165 | Seaton | Apr. 19, 1927 |
| 2,457,820 | Howe | Jan. 4, 1949 |
| 2,531,097 | Alpert | Nov. 21, 1950 |
| 2,791,533 | Segal | May 7, 1957 |

OTHER REFERENCES

Lederle: J. Am. Med. Assoc., vol. 152, No. 18, advertisement, p. 15, August 1953.

Tabor: J. Am. Chem. Assoc., vol. 78, pp. 5705–5706, 1956.

Seegmiller: J. Am. Chem. Soc., vol. 76, p. 6205, 1954.

Tabor: J. Am. Chem. Assoc., vol. 75, pp. 756–757, 1953.

Broquist: J. Am. Chem. Soc., vol. 78, pp. 6205–6206, 1956.

Whipple: J. of Experimental Med., vol. 71, p. 582, 1940.

Tabor: Pharmacol. Rev., vol. 6, p. 313, 1954.

Wintrobe: Clinical Hematology, 1946, p. 91, pub. by Lea and Febiger.

Annals of Surgery, Walker, Protein Add., January 1947, p. 41.

Physician Bulletin, June 1947, pp. 77–81.

Lederle: The Common Forms of Anemia, January 1947, pp. 13–18.

Williams et al.: Chem. Abs., vol. 49, 1955, 7016d.

Sebrell et al.: The Vitamins, vol. III, 1954, p. 39, p. 55, p. 59, Academic Press.

Fontes et al.: Compt. rend. Soc. Biol., vol. 106, pp. 592–4, 1931.

Spector: Handbook of Biological Data, 1956, p. 238.

UNITED STATES PATENT OFFICE
CERTIFICATE OF CORRECTION

Patent No. 3,157,575                                    November 17, 1964

Adrian Leonard Luhby

It is hereby certified that error appears in the above numbered patent requiring correction and that the said Letters Patent should read as corrected below.

Column 2, line 51, for "opens" read -- ones --; column 3, line 47, for "results" read -- result --; column 4, line 26, for "paraaminoben-" read -- para-aminoben- --; column 5, line 23, for "that" read -- this --; line 40, for "pressure" read -- presence --; same column 5, line 72, for "47" read -- 48 --; column 7, line 14, for "of", first occurrence, read -- to --; column 8, line 74, for "does" read -- dose --; line 75, for "only", first occurrence, read -- one --; column 9, line 17, for "2.72" read -- 2.82 --.

(SEAL)     Signed and sealed this 30th day of March 1965.

Attest:

ERNEST W. SWIDER                                          EDWARD J. BRENNER
Attesting Officer                                             Commissioner of Patents